US009325385B2

(12) United States Patent
Ikenaga et al.

(10) Patent No.: US 9,325,385 B2
(45) Date of Patent: Apr. 26, 2016

(54) USER EQUIPMENT, COMMUNICATION METHOD, PROGRAM, AND COMMUNICATION SYSTEM

(71) Applicant: Sony Corporation, Tokyo (JP)

(72) Inventors: Yoshihiko Ikenaga, Tokyo (JP); Katsutoshi Itoh, Tokyo (JP); Hideyuki Suzuki, Tokyo (JP); Erika Saito, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/387,286

(22) PCT Filed: Mar. 22, 2013

(86) PCT No.: PCT/JP2013/058219
§ 371 (c)(1),
(2) Date: Sep. 23, 2014

(87) PCT Pub. No.: WO2013/146564
PCT Pub. Date: Oct. 3, 2013

(65) Prior Publication Data
US 2015/0050882 A1 Feb. 19, 2015

(30) Foreign Application Priority Data

Mar. 30, 2012 (JP) .................................. 2012-082534

(51) Int. Cl.
*H04B 5/00* (2006.01)
*H04W 12/06* (2009.01)
(Continued)

(52) U.S. Cl.
CPC .............. *H04B 5/0031* (2013.01); *H04L 47/70* (2013.01); *H04W 12/06* (2013.01); *H04W 84/18* (2013.01)

(58) Field of Classification Search
CPC .... H04B 5/0031; H04W 12/06; H04W 84/18; H04L 29/12518; H04L 47/70
See application file for complete search history.

(56) References Cited

U.S. PATENT DOCUMENTS

| 8,145,755 B2 * | 3/2012 | Iwakawa ................. H04L 63/04 709/223 |
| 2003/0151515 A1 * | 8/2003 | Yuzuki ............... G08B 21/0227 340/573.4 |

(Continued)

FOREIGN PATENT DOCUMENTS

| JP | 2008-283590 | 11/2008 |
| JP | 2010-519863 | 6/2010 |
| JP | 2011-166194 | 8/2011 |

*Primary Examiner* — Andrew Wendell
(74) *Attorney, Agent, or Firm* — Sony Corporation

(57) ABSTRACT

The present disclosure relates to user equipment for, a communication method of, a program for, and a communication system for starting wireless communication among pieces of user equipment without placing operational load on a user. In the communication system according to the present disclosure, child equipment includes a detection module that detects different user equipment and performs authentication processing with the different user equipment that is detected, a notification module that notifies the parent equipment of identification information indicating the different user equipment that has been authenticated, and a communication module that performs the wireless communication with the different user equipment that is caused to belong to the group that is managed by the parent equipment, and the parent equipment includes an obtainment module that obtains the identification information which is notified from the child equipment, and an authentication module that, if there is a connection request from different user equipment that does not belong to the group, authenticates connection of the different user equipment that does not belong to the group, based on the identification information that is notified from the child equipment. The present disclosure, for example, can be applied to the user equipment that performs the wireless communication according to Wi-Fi Direct.

20 Claims, 10 Drawing Sheets

(51) Int. Cl.
  *H04L 29/12* (2006.01)
  *H04L 12/911* (2013.01)
  *H04W 84/18* (2009.01)

(56) References Cited

U.S. PATENT DOCUMENTS

| | | | |
|---|---|---|---|
| 2005/0009498 A1* | 1/2005 | Ho | H04L 12/2803 455/402 |
| 2005/0030933 A1* | 2/2005 | Seyama | H04W 74/06 370/346 |
| 2007/0223398 A1* | 9/2007 | Luo | H04W 4/08 370/254 |
| 2009/0210596 A1* | 8/2009 | Furuya | G06F 13/4247 710/110 |
| 2010/0250805 A1* | 9/2010 | Cohen | G06F 13/4004 710/110 |
| 2011/0035799 A1* | 2/2011 | Handler | G06F 21/606 726/21 |
| 2011/0143757 A1* | 6/2011 | Oh | H04W 4/08 455/435.2 |
| 2014/0125453 A1* | 5/2014 | McIntyre | H04L 63/0853 340/5.7 |

* cited by examiner

USER EQUIPMENT, COMMUNICATION METHOD, PROGRAM, AND COMMUNICATION SYSTEM

CROSS-REFERENCE TO RELATED APPLICATIONS

This application is the National Stage of International Application No. PCT/JP2013/058219, filed in the Japanese Patent Office as a Receiving Office on Mar. 22, 2013, which claims priority to Japanese Patent Application Number 2012-082534, filed in the Japanese Patent Office on Mar. 30, 2012, each of which is hereby incorporated by reference in its entirety.

TECHNICAL FIELD

The present disclosure relates to user equipment, a communication method, a program, and a communication system, and relates to user equipment, a communication method, a program, and a communication system that are suitable, for example, for a case where different equipment performs wireless communication on user equipment that has already established a connection to parent user equipment.

BACKGROUND ART

Wi-Fi Alliance, which is an association that promotes popularization of wireless LAN which is represented by Wi-Fi, has standardized specifications called Wi-Fi Direct, according to which pieces of user equipment can directly perform wireless communication without involving an access point.

A case where the pieces of user equipment perform the wireless communication according to Wi-Fi Direct in the related art is described referring to FIGS. 1 and 2. FIG. 1 illustrates a P2P group that is configured according to Wi-Fi Direct. FIG. 2 illustrates a connection sequence that is involved until the pieces of user equipment perform the wireless communication according to Wi-Fi Direct.

For example, a case is considered where user equipment (hereinafter referred to as connection-available child equipment) 3 which does not currently belong to any P2P group performs the wireless communication on user equipment (hereinafter referred to as child equipment) 2 as child equipment that belongs to a P2P group of user equipment (hereinafter referred to as parent equipment) 1 that operates as parent equipment (a group owner).

In this case, in order for the connection-available child equipment 3 to perform the wireless communication with the child equipment 2, before doing so, the connection-available child equipment 3 needs to be connected to the parent equipment 1 and thus perform authentication processing. In other words, the connection-available child equipment 3 needs to be caused to belong to the P2P group of the parent equipment 1. A specific procedure is as illustrated in FIG. 2.

That is, when in Step S1, the connection-available child equipment 3 transmits a probe request for searching for the user equipment that is present in the neighborhood, the parent equipment 1 transmits a probe response in response to the probe request (Step S2). In the probe response, information on the child equipment 2 that belongs to the P2P group of the parent equipment 1 is included.

The connection-available child equipment that ensures that the child equipment 2 belongs to the P2P group of the parent equipment 1 transmits a provisioning request for requesting for connection to the parent equipment 1 in Step S3.

The parent equipment 1 that receives the provisioning request from the connection-available child equipment 3 leaves it to a user to determine whether or not the connection of the connection-available child equipment 3 to the P2P group of the parent equipment 1 is approved in Step S4. At this point, if an input from the user is present to the effect that the connection of the connection-available child equipment 3 to the P2P group of the parent equipment 1 is approved, key exchange using Wi-Fi protected setup (WPS) is performed between the parent equipment 1 and the connection-available child equipment 3, and the authentication processing using a 4-way handshake that uses the key is performed (Steps S5 and S6).

In this manner, after the authentication processing with the parent equipment 1 is terminated (after the connection-available child equipment 3 is caused to belong to the P2P group of the parent equipment 1), the connection-available child equipment 3 can perform the wireless communication as if the connection-available child equipment 3 were connected directly to the child equipment 2 (Step S7). In addition, in practice, the connection-available child equipment 3 performs the wireless communication on the child equipment 2 through the parent equipment 1.

At this point, as an operation of approving the connection between the user of the parent equipment 1 and the connection-available child equipment 3, there is, for example, a method of pushing down a WPS button that is provided to the parent equipment 1 (refer to PTL 1).

CITATION LIST

Patent Literature

PTL 1: Japanese Unexamined Patent Application Publication No. 2008-283590

SUMMARY OF INVENTION

Technical Problem

As described above, in order for the connection-available child equipment 3 to perform the wireless communication with the child equipment 2 that belongs to the P2P group of the parent equipment 1, before doing so, the connection-available child equipment 3 needs to perform the authentication processing with the parent equipment 1, but it is difficult for the user to understand that the operation on the parent equipment 1 by the user is necessary for the authentication processing. Particularly, if the user does not know a place where the parent equipment 1 is arranged, the operational input by the user, as described above, is practically impossible.

The present disclosure, which is contemplated in view of such a situation, is such that wireless communication can start between pieces of user equipment without placing operational load on a user.

Solution to Problem

According to a first aspect of the present disclosure, there is provided user equipment that performs wireless communication as child equipment which belongs to a group which is managed by parent equipment, the user equipment including: a detection module that detects different user equipment as being in close proximity and performs authentication processing with the different user equipment that is detected; a notification module that notifies the parent equipment of identification information indicating the different user equipment that has been authenticated; and a communication module that performs the wireless communication with the different user equipment that is caused to belong to the group that is managed by the parent equipment.

The communication module may directly perform the wireless communication with the different user equipment that is caused by the parent equipment to belong to the group, based on the identification information that is reported by the notification module.

The detection module may authenticate the different user equipment by detecting the different user equipment as being in close proximity.

The detection means may detect the different user equipment as being in close proximity, based on strength of a wireless signal that is transmitted by the different user equipment.

The detection means may detect the different user equipment as being in close proximity using NFC.

The user equipment may be at least any one of a personal computer, a smartphone, a digital camera, and a mobile player.

The user equipment may be at least any one of a television receiver, an NAS, and a stereo system.

The user equipment may include a user interface.

According to the first aspect of the present disclosure, there is provided a communication method for use in user equipment that performs wireless communication as child equipment which belongs to a group which is managed by parent equipment, the communication method including: a detection step of causing the user equipment to detect different user equipment; an authentication step of performing authentication processing with the different user equipment that is detected; a notification step of notifying the parent equipment of identification information indicating the different user equipment that has been authenticated; and a communication step of performing the wireless communication directly with the different user equipment that is caused to belong to the group that is managed by the parent equipment.

According to the first aspect of the present disclosure, there is provided a program for causing a computer that performs wireless communication as child equipment which belongs to a group that is managed by parent equipment, to function as: a detection module that detects different user equipment and performs authentication processing with the different user equipment that is detected; a notification module that notifies the parent equipment of identification information indicating the different user equipment that has been authenticated; and a communication module that performs the wireless communication directly with the different user equipment that is caused to belong to the group that is managed by the parent equipment.

According to the first aspect of the present disclosure, the different user equipment is detected as being in close proximity, the authentication processing with the different user equipment that is detected is performed, the identification information indicating the different user equipment that has been authenticated is notified to the parent equipment, and the wireless communication with the different user equipment that is caused to belong to the group that is managed by the parent equipment is performed.

According to a second aspect of the present disclosure, there is provided user equipment that performs wireless communication with child equipment that belongs to a group that is managed by the user equipment itself as parent equipment, the user equipment including: an obtainment module that obtains identification information indicating different user equipment that has been authenticated by the child equipment, which is notified from the child equipment; and an authentication module that, if there is a connection request from different user equipment that does not belong to the group, authenticates connection of the different user equipment that does not belong to the group, based on the identification information that is notified from the child equipment.

The obtainment module may obtain and list the identification information that is notified from the child equipment, and if there is present the connection request from the different user equipment that does not belong to the group, the authentication module may determine whether or not connection of the different user equipment that does not belong to the group is approved, by referring to the identification information that is listed.

According to the second aspect of the present disclosure, there is provided a communication method for use in user equipment that performs wireless communication with child equipment that belongs to a group that is managed by the user equipment itself as parent equipment, the communication method including: an obtainment step of causing the user equipment to obtain identification information indicating different user equipment that has been authenticated by the child equipment, which is notified from the child equipment; and an authentication step of authenticating connection of the different user equipment that does not belong to the group, based on the identification information that is notified from the child equipment, if there is a connection request from different user equipment that does not belong to the group.

According to the second aspect of the present disclosure, there is provided a program for causing a computer that performs wireless communication with child equipment that belongs to a group that is managed by the computer as equipment itself as parent equipment, to function as: an obtainment module that obtains identification information indicating different user equipment that has been authenticated by the child equipment, which is notified from the child equipment; and an authentication module that, if there is a connection request from different user equipment that does not belong to the group, authenticates connection of the different user equipment that does not belong to the group, based on the identification information that is notified from the child equipment.

According to the second aspect of the present disclosure, the identification information indicating the different user equipment that has been authenticated by the child equipment, which is notified from the child equipment, is obtained, and if there is a connection request from different user equipment that does not belong to the group, the connection of the different user equipment that does not belong to the group is authenticated based on the identification information that is notified from the child equipment.

According to a third aspect of the present disclosure, there is provided a communication system in which parent equipment and child equipment that belongs to a group that is managed by the parent equipment perform wireless communication, in which the child equipment includes a detection module that detects different user equipment and performs authentication processing with the different user equipment that is detected; a notification module that notifies the parent equipment of identification information indicating the different user equipment that has been authenticated; and a communication module that performs the wireless communication with the different user equipment that is caused to belong to the group that is managed by the parent equipment. Meanwhile, the parent equipment includes an obtainment module that obtains the identification information which is notified from the child equipment, and an authentication module that, if there is a connection request from different user equipment that does not belong to the group, authenticates connection of the different user equipment that does not belong to the group, based on the identification information that is notified from the child equipment.

According to the third aspect of the present disclosure, by the child equipment the different user equipment is detected, the authentication processing with the different user equipment that is detected is performed, and the identification information indicating the different user equipment that has been authenticated is notified to the parent equipment. In contrast, if the identification information that is notified from the child equipment is obtained and the connection request from the different user equipment that does not belong to the group is present, the connection of the different user equipment that does not belong to the group is authenticated by the parent equipment based on the identification information that is notified from the child equipment. Then, by the child equipment the wireless communication is performed directly with the different user equipment that is caused to belong to the group that is managed by the parent equipment.

According to a fourth aspect of the present disclosure, there is provided user equipment that performs wireless communication as parent equipment that belongs to a group, the user equipment including a reception module that receives identification information indicating user equipment that has been authenticated, from different user equipment that, unlike the user equipment, has a close-proximity detection module, and a registration module that puts the identification information on a list.

The close-proximity detection module may be configured using the NFC.

The user equipment may be at least any one of a personal computer, a smartphone, a digital camera, and a mobile player.

The user equipment may be at least any one of a television receiver, an NAS, and a stereo system.

The user equipment may include a user interface.

According to the fourth aspect of the present disclosure, the identification information indicating the user equipment that has been authenticated is received from the different user equipment that, unlike the user equipment, has the close-proximity detection module, and the identification information is put on the list.

Advantageous Effects of Invention

According to the first aspect of the present disclosure, the identification information indicating the different user equipment that has been authenticated by the user equipment itself can be notified to the parent equipment.

According to the second aspect of the present disclosure, the connection of the different user equipment that does not belong to the group can be authenticated based on the identification information that is notified from the child equipment.

According to the third aspect of the present disclosure, the wireless communication can start between the pieces of user equipment without placing the operational load on the user.

According to the fourth aspect of the present disclosure, the identification information indicating the user equipment that has been authenticated by the different user equipment can be put on the list.

DESCRIPTION OF EMBODIMENTS

Figure 1:
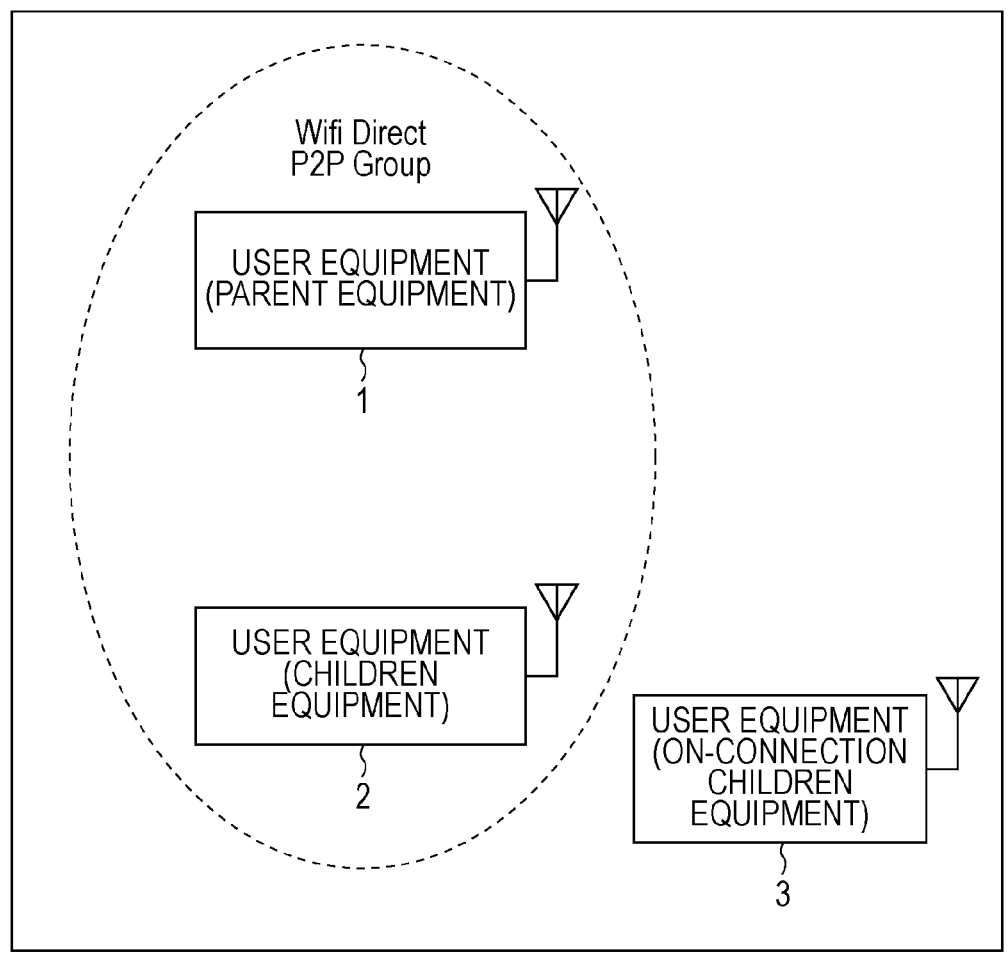
FIG. 1 is a diagram for describing a case where pieces of user equipment perform wireless communication according to Wi-Fi Direct.

A best embodiment (hereinafter referred to as an embodiment) according to the present disclosure is described in detail below referring to the drawings.

[Configuration Example of a Communication System]

Figure 3:
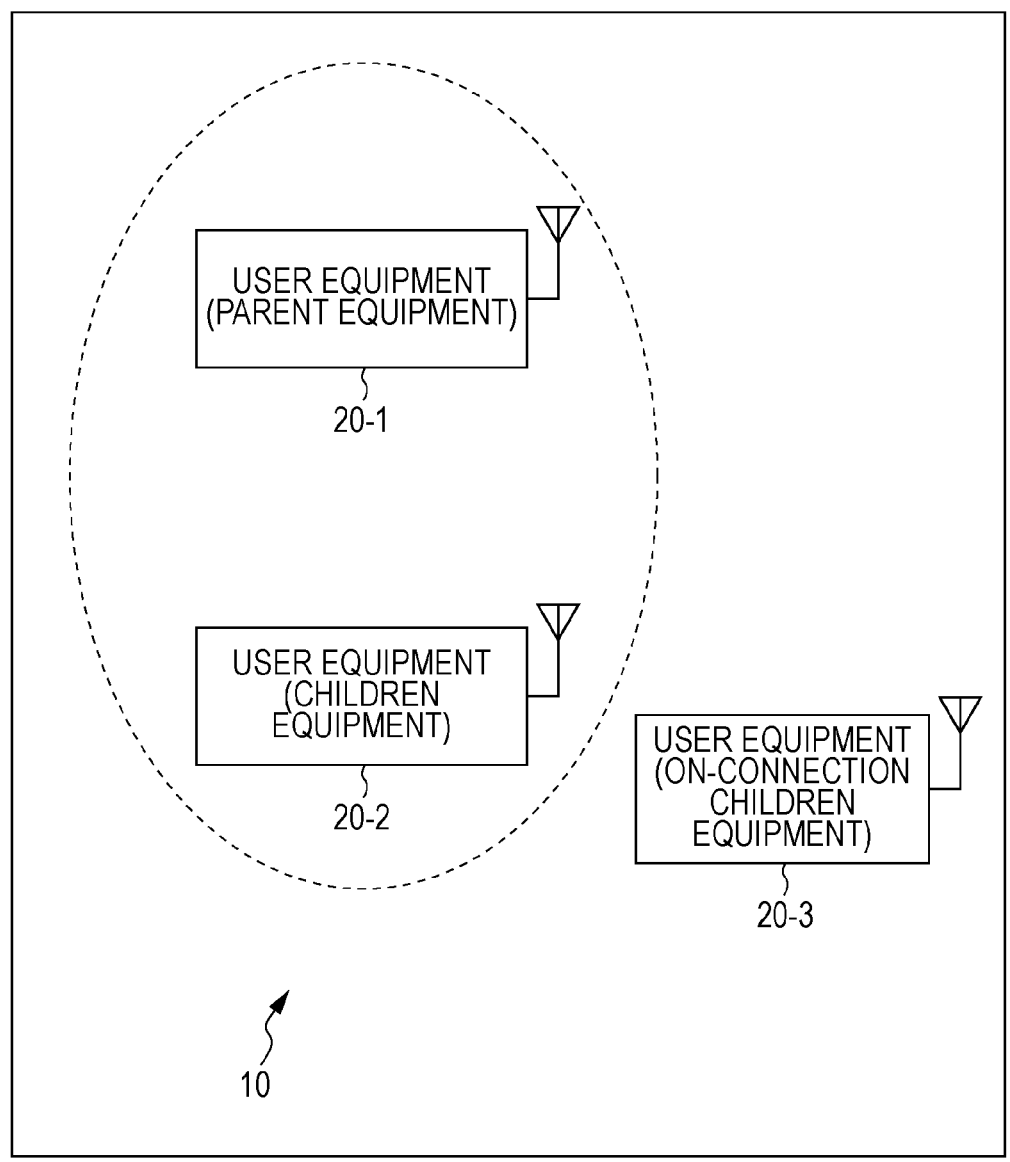
FIG. 3 is a diagram illustrating a configuration example of a communication system to which the present disclosure is applied.

FIG. 3 is a configuration example of a communication system 10 according to the present embodiment. The communication system 10 is configured from multiple pieces of user equipment 20. Among the multiple pieces of user equipment 20, one piece of user equipment 20-1 operates as parent equipment, and a piece of user equipment 20-2 operates as child equipment that belongs to a P2P group of the user equipment 20-1 as the parent equipment. Moreover, user equipment 20-3 is present that tries to perform wireless communication with the user equipment 20-2.

The user equipment 20-1 is hereafter referred to as parent equipment 20-1, the user equipment 20-2 as child equipment 20-2, and the user equipment 20-3 as connection-available child equipment 20-3. Furthermore, the pieces of user equipment 20-1 to 20-3 are collectively referred to as the user equipment 20 if the pieces of user equipment 20-1 to 20-3 do not need to be individually distinguished.

[Configuration Example of the User Equipment 20]

Figure 4:
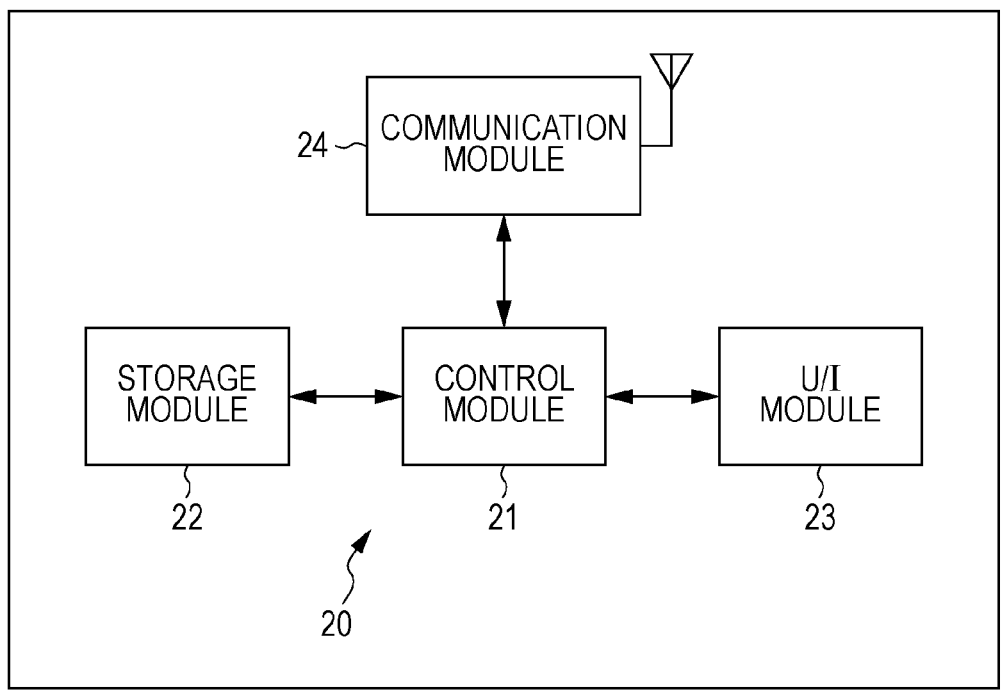
FIG. 4 is a block diagram illustrating a configuration example of the user equipment.

FIG. 4 illustrates a configuration example of the user equipment 20. The user equipment 20 has a control module 21, a storage module 22, a user interface (U/I) module 23, and a communication module 24.

The control module 21 executes a control program that is stored in the storage module 22 and thus controls the entire user equipment 20 and realizes a functional block for operating as the parent equipment, the child equipment, or the connection-available child equipment. In the storage module 22, the control programs or various pieces of information are stored and a key used for performing coding for the wireless communication is stored.

The U/I module 23 is made from an input device that a user uses for operational input and an output device that shows information to the user. The input devices, for example, include hardware or software buttons for WPS, a keyboard, a touch panel, a voice input module, an NFC module, an accelerator sensor, and the like. In addition to a display device such as a display, the output devices include means that notifies the user of the information using sound, light, vibration, and the like. The communication module 24 performs the wireless communication with different user equipment 20 under the control of the control module 21.

[Configuration Example of the Functional Block of the User Equipment 20-1 that Plays a Role as the Parent Equipment]

Figure 5:
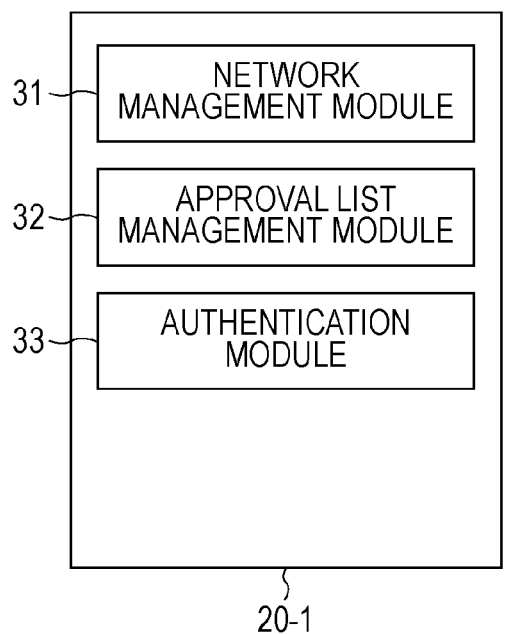
FIG. 5 is a configuration diagram of a functional block of the user equipment that plays a role as the parent equipment.

FIG. 5 illustrates a configuration example of the functional block of the user equipment 20-1 that plays a role as the parent equipment.

A network management module 31 performs the communication with the child equipment that belongs to the P2P group that is managed by the user equipment 20-1 itself as the parent equipment. For management, an approval list management module 32 lists identification information on the connection-available child equipment that completes authentication processing with the child equipment, which is notified from the child equipment that has already been given approval of a connection to the user equipment 20-1 itself. An authentication module 33 performs the authentication processing with the child equipment or the connection-available child equipment.

[Configuration Example of the Functional Block of the User Equipment 20-2 that Plays a Role as the Child Equipment]

Figure 6:
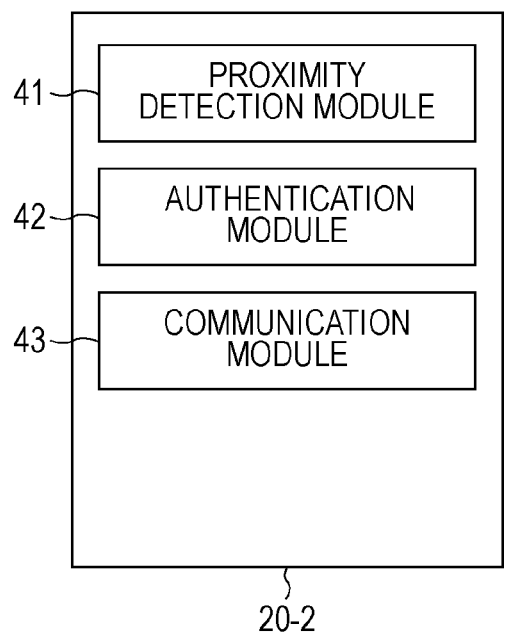
FIG. 6 is a configuration diagram of the functional block of the user equipment that plays a role as the child equipment.

FIG. 6 illustrates a configuration example of the functional block of the user equipment 20-2 that plays a role as the parent equipment.

A close-proximity detection module 41 detects different user equipment 20 (connection-available child equipment 20-3 and the like) that approaches a short distance (several cm) from the user equipment 20-2 and authenticates the different user equipment 20 by the fact that the different user equipment 20 can be detected. Such a detection method is used based on whether or not strength of a signal that is transmitted from the different user equipment 20 that is in close proximity is at or above a predetermined threshold. Furthermore, wireless technologies different from a Wi-Fi technology such as a near field communication (NFC) technology may be employed.

An authentication module 42 performs the authentication processing with the parent equipment 20-1 or the connection-available child equipment 20-3. In addition, the authentication module 42 may perform the authentication processing with the connection-available child equipment 20-3 that is detected as being in close proximity. A communication module 43 performs the wireless communication with the parent equipment 20-1 or the connection-available child equipment 20-3.

[Configuration Example of the Functional Block of the User Equipment 20-3 that Plays a Role as the Connection-Available Child Equipment]

Figure 7:
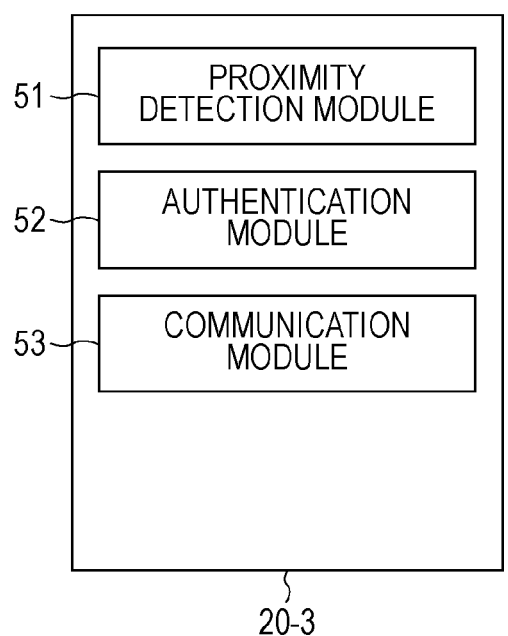
FIG. 7 is a configuration diagram of the functional block of the user equipment that plays a role as the connection-available child equipment.

FIG. 7 illustrates a configuration example of the functional block of the user equipment 20-3 that plays a role as the connection-available child equipment.

A close-proximity detection module 51 detects different user equipment 20 (child equipment 20-2 and the like) that approaches a short distance from the user equipment 20-3 and authenticates the different user equipment 20 by the fact that the different user equipment 20 can be detected. Such a detection method is used based on whether or not strength of a signal that is transmitted from the different user equipment 20 that is in close proximity is a predetermined threshold or above. Furthermore, wireless technologies different from the Wi-Fi technology such as the near field communication (NFC) technology may be employed.

An authentication module 52 performs the authentication processing with the parent equipment 20-1. In addition, the authentication module 52 may perform the authentication processing with the child equipment 20-2 that is detected as being in close proximity. A communication module 53 performs the wireless communication with the parent equipment 20-1 or the child equipment 20-2.

In addition, the child equipment 20-2 and the connection-available child equipment 20-3 have been described so far as having different functional blocks, respectively, but the functional blocks of the child equipment 20-2 and the connection-available child equipment 20-3 may be combined.

[Operation of the Communication System 10]

Next, operation of the communication system 10 is described.

Figure 8:
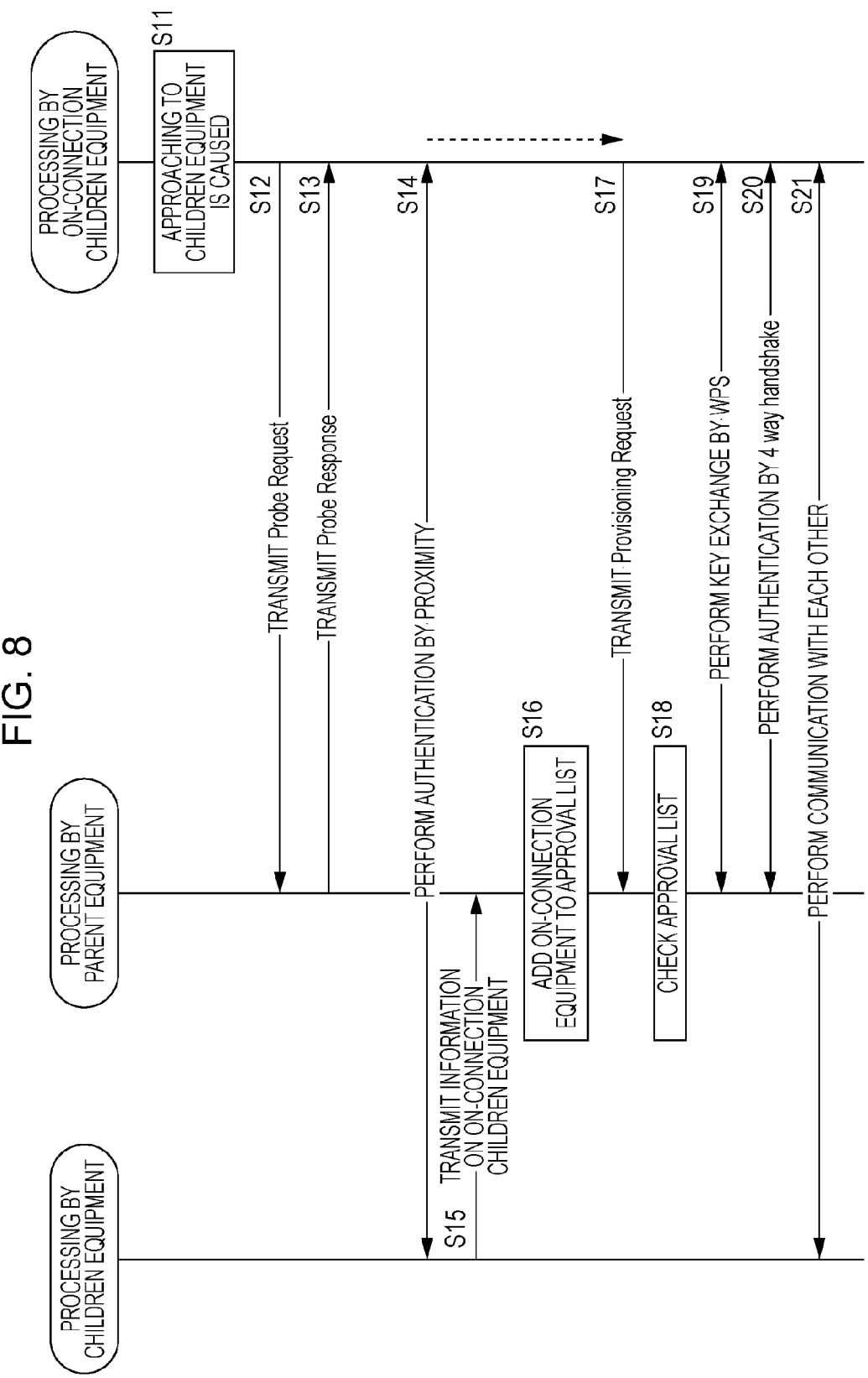
FIG. 8 is a diagram illustrating a connection sequence that is involved until the pieces of user equipment directly perform the wireless communication in the communication system to which the present disclosure is applied.

FIG. 8 illustrates a connection sequence that is involved in a case where the connection-available child equipment 20-3 that does not currently belong to any P2P group performs the wireless communication on the child equipment 20-2 that belongs to the P2P group of the parent equipment 20-1.

In Step S11, the user of the connection-available child equipment 20-3 brings the connection-available child equipment 20-3 into close proximity to the child equipment 20-2 on which the user wants to perform the wireless communication with the connection-available child equipment 20-3. Accordingly, if the connection-available child equipment 20-3 detects the presence of the child equipment 20-2, in Step S12, the connection-available child equipment 20-3, triggered by the detection, transmits a probe request for searching for the user equipment 20 that is present in the neighborhood of the connection-available child equipment 20-3.

In Step S13, the parent equipment 20-1 that receives the probe request transmits a probe response that includes identification information (a MAC address, a device name, a model name, a UUID, and the like) on the child equipment 20-2 that belongs to the P2P group of the parent equipment 20-1. In addition, the processing in Step S11 may be performed after the processing in Step S13.

In Step S14, the connection-available child equipment 20-3 that ensures that the identification information on the child equipment 20-2 is included in the probe response from the parent equipment 20-1 authenticates the child equipment 20-2 that is detected as being in close proximity, with such close-proximity detection. In such authentication processing, for example, a service discovery query or a service discovery response can be employed that is defined in Wi-Fi Direct. Furthermore, in addition to the technologies described above, the authentication may be performed using the NFC technology.

In Step S15, the child equipment 20-2 that finishes the authentication processing using the close-proximity detection between the child equipment 20-2 and the connection-available child equipment 20-3 codes the identification information (the MAC address, the device name, the model name, the UUID, and the like) on the connection-available child equipment 20-3 that has been authenticated by the child equipment 20-2 itself, using a key that is shared among the P2P group of the parent equipment 20-1, and transmits the coded identification information to the parent equipment 20-1.

In Step S16, the parent equipment 20-1 that receives the coded identification information adds the identification information on the connection-available child equipment 20-3 that has been authenticated by the child equipment 20-2, to an approval list that is managed by the parent equipment 20-1 itself.

In Step S17, after a predetermined time (several seconds assumed to be necessary for the processing in Step S15 and the processing in Step 16) elapses from when the authentication processing using the close proximity to the child equipment 20-2 is performed (the processing in Step S14), the connection-available child equipment 20-3 transmits a provisioning request for requesting for the connection to the parent equipment 20-1.

In Step S18, the parent equipment 20-1 that receives the provisioning request from the connection-available child equipment 20-3 checks whether or not the identification information on the connection-available child equipment 20-3 is included in the approval list that is managed by the parent equipment 20-1 itself. At this point, if the identification information on the connection-available child equipment 20-3 is included in the approval list, the connection-available child equipment 20-3 is the user equipment 20 that can be determined as being reliable because the connection-available child equipment 20-3 has already been authenticated by the child equipment 20-2. Then, the parent equipment 20-1 performs key exchange using the WPS between the parent equipment 20-1 and the connection-available child equipment 20-3 without having the user confirm whether or not the connection of the connection-available child equipment 20-3 is approved, and executes the authentication processing using a 4 way handshake that uses the key (Steps S19 and S20).

In Step S21, after the authentication processing with the parent equipment 20-1 is terminated in this manner (after the connection-available child equipment 20-3 is caused to belong to the P2P group of the parent equipment 20-1), it is possible for the connection-available child equipment 20-3 to perform the wireless communication with the child equipment 20-2. FIG. 8 illustrates that the connection-available child equipment 20-3 and the child equipment 20-2 directly perform the wireless communication, but in practice, the wireless communication is performed through the parent equipment 20-1.

In addition, in Step S18, if the identification information on the connection-available child equipment 20-3 is not included in the approval list, the parent equipment 20-1 has the user confirm whether or not the connection of the connection-available child equipment 20-3 is approved. Alternatively, the connection of the connection-available child equipment 20-3 may be denied without having the user's confirmation.

Furthermore, as a modification example of the connection sequence described above, after the authentication processing using the close proximity to the child equipment 20-2 is performed (the processing in Step 14), the connection-available child equipment 20-3 may immediately transmit the provisioning request to the parent equipment 20-1. In this case, if the identification information on the connection-available child equipment 20-3 that has been authenticated is notified from the child equipment 20-2, the parent equipment 20-1 promptly performs the key exchange using the WPS between the parent equipment 20-1 and the connection-available child equipment 20-3 without adding the identification information to the approval list and executes the authentication processing using the 4 way handshake that uses the key.

Figure 2:
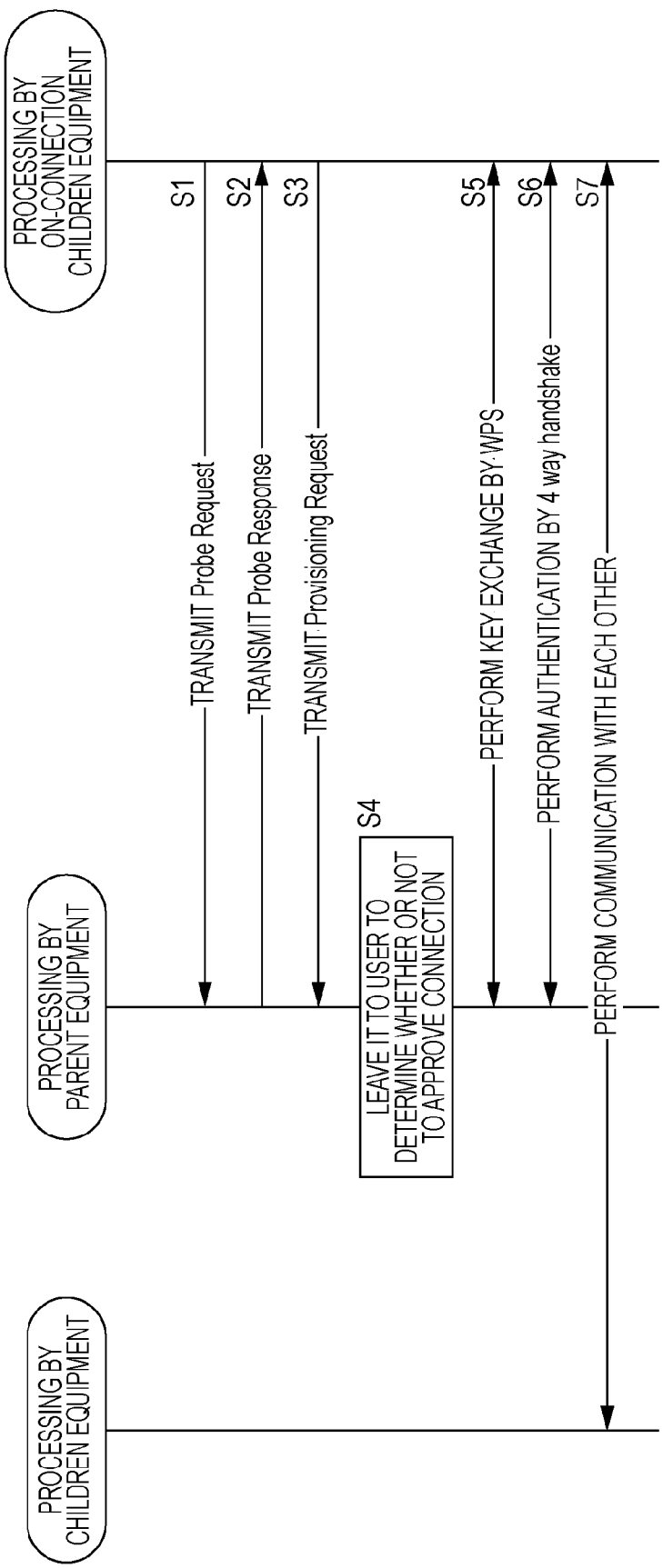
FIG. 2 is a diagram illustrating a connection sequence in the related art that is involved until the pieces of user equipment perform the wireless communication.

In the connection sequence in the communication system 10 described above, the processing (Step S4 in FIG. 3) can be omitted in which the parent equipment 20-1 has the user check confirm whether or not the connection of the connection-available child equipment 20-3 is approved, compared with the connection sequence in the related art, described referring to FIG. 2. Consequently, with the communication system 10, the wireless communication can start between the pieces of user equipment (the child equipment 20-2 and the connection-available child equipment 20-3) without placing operational load on the user.

Next, processing by each of the parent equipment 20-1, the child equipment 20-2, and the connection-available child equipment 20-3 for realizing the connection sequence described above is described in detail.

Figure 9:
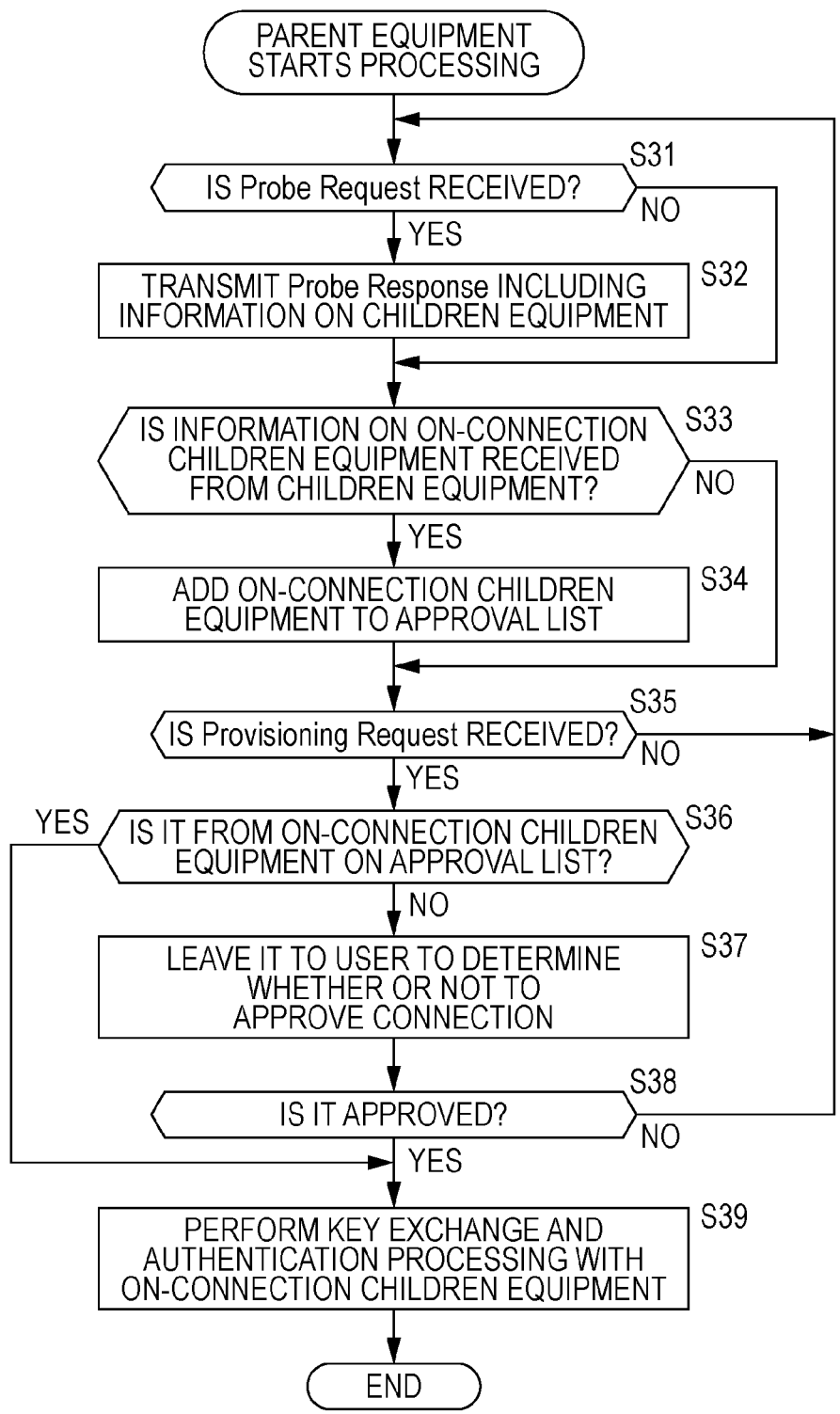
FIG. 9 is a flow chart for describing processing by the parent equipment.

FIG. 9 is a flow chart for describing in detail the processing of the parent equipment 20-1 in the connection sequence described above.

In Step S31, the network management module 31 of the parent equipment 20-1 determines whether or not the probe request is received, and if a result of the determination is positive, the processing proceeds to Step S32. In Step S32, the network management module 31 transmits to the connection-available child equipment 20-3 the probe response that includes the identification information on the child equipment 20-2 that belongs to the P2P group of the parent equipment 20-1. In addition, if the result of the determination in Step S31 is negative, the processing in Step S32 is skipped.

In Step S33, the approval list management module 32 of the parent equipment 20-1 determines whether or not the child equipment 20-2 receives from the child equipment 20-2 the identification information on the connection-available child equipment 20-3 that has been authenticated, and if the result of the determination is positive, the processing proceeds to Step S34. In Step S34, the approval list management module 32 adds the identification information on the connection-available child equipment 20-3 to the approval list that is managed by the approval list management module 32 itself. In addition, if the result of the determination in Step S33 is negative, the processing in Step S34 is skipped.

In Step S35, the network management module 31 of the parent equipment 20-1 determines whether or not the provisioning request is received, and if a result of the determination is positive, the processing proceeds to Step S36. In addition, if the result of the determination in Step S35 is negative, the processing returns to Step S31, and Steps S31 and later are repeated.

In Step S36, the authentication module 33 determines whether or not the identification information on a transmission source (the connection-available child equipment 20-3 in this case) of the provisioning request is included in the approval list, and if a result of the determination is negative, the processing proceeds to Step S37. In Step S37, the authentication module 33 leaves it to the user to determine whether or not the connection of the transmission source (the connection-available child equipment 20-3 in this case) of the provisioning request is approved. In Step S38, it is determined whether or not the connection of the transmission source is approved by the user. If a result of the determination in Step S38 is positive, the processing proceeds to Step S39. In addition, if the result of the determination in Step S38 is negative, the processing returns to Step S31 and Steps S31 and later are repeated.

Furthermore, even though the result of the determination in Step S36 is negative, Steps S37 and S38 are skipped, and thus, the processing proceeds to Step S39.

In Step S39, the authentication module 33 performs the key exchange using the WPS between the authentication module 33 and the connection-available child equipment 20-3 and executes the authentication processing using the 4 way handshake. Accordingly, the connection-available child equipment 20-3 is caused to belong to the P2P group of the parent equipment 20-1. The description of the processing by the parent equipment 20-1 ends with this.

Figure 10:
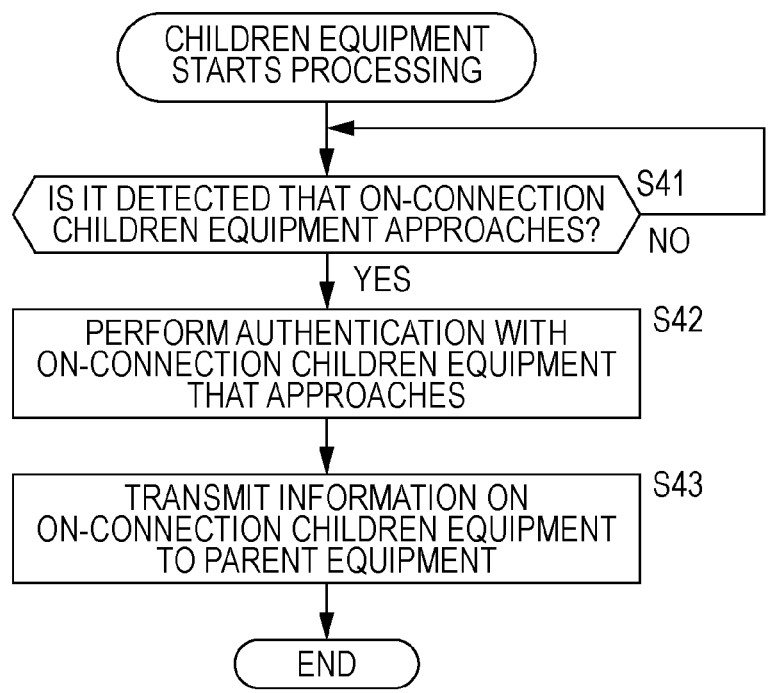
FIG. 10 is a flow chart for describing processing by the child equipment.

Next, FIG. 10 is a flow chart for describing processing by the child equipment 20-2 in the connection sequence described above.

In Step S41, the close-proximity detection module 41 of the child equipment 20-2 waits until it is determined that the child equipment 20-2 is in close proximity to different user equipment 20 (the connection-available child equipment 20-3 in this case). If it is determined that the child equipment 20-2 is in close proximity to the different user equipment 20, the processing proceeds to Step S42.

In Step S42, the close-proximity detection module 41 authenticates the different user equipment 20 (the connection-available child equipment 20-3 in this case) that is detected as being in close proximity. In Step S43, the communication module 43 codes the identification information on the connection-available child equipment 20-3 that has been authenticated and thus transmits the coded identification information to the parent equipment 20-1. The description of the processing by the child equipment 20-2 ends with this.

Figure 11:
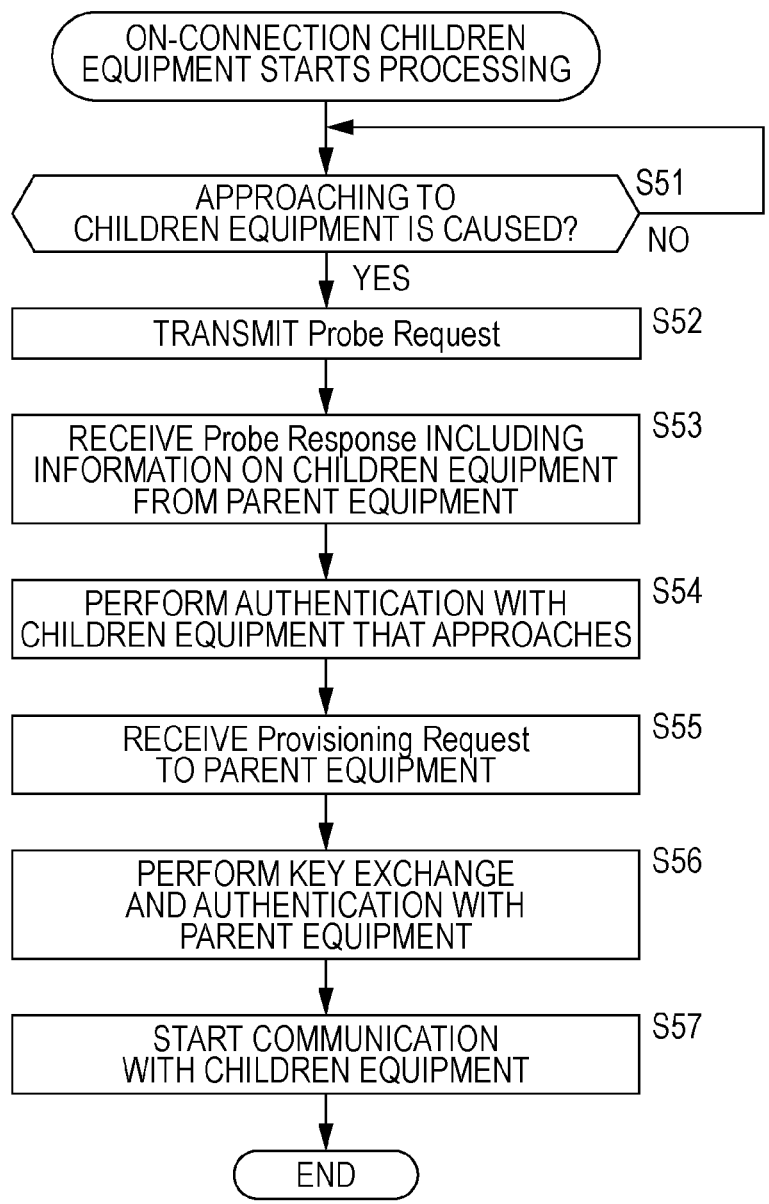
FIG. 11 is a flow chart for describing processing by the connection-available child equipment.

Next, FIG. 11 is a flow chart for describing processing by the connection-available child equipment 20-3 in the connection sequence described above.

In Step S51, the close-proximity detection module 51 of the connection-available child equipment 20-3 waits until it is determined that the connection-available child equipment 20-3 is in close proximity to different user equipment 20 (the child equipment 20-2 in this case). If it is determined that the connection-available child equipment 20-3 is in close proximity to the different user equipment 20, the processing proceeds to Step S52.

In Step S52, the communication module 53 of the connection-available child equipment 20-3 transmits the probe request. In Step S53, the communication module 53 receives the probe response that is transmitted from the parent equipment 20-1 in response to the probe request. If it is ensured that the identification information on the child equipment 20-2 is included in the probe response, in Step S54, the close-proximity detection module 51 authenticates the child equipment 20-2 that is detected as being in close proximity.

In Step S55, the communication module 53 transmits the provisioning request to the parent equipment 20-1. If the connection of the connection-available child equipment 20-3 is permitted by the parent equipment 20-1 that receives the provisioning request, in Step S56, the authentication module 52 performs the key exchange using the WPS between the connection-available child equipment 20-3 and the parent equipment 20-1, and executes the authentication processing using 4 way handshake that uses the key. In Step S57, the communication module 53 starts the wireless communication with the child equipment 20-2.

As described above, with the communication system 10, user identification that is necessary in the related art can be omitted at the time of the connection of the connection-available child equipment 20-3 to the parent equipment 20-1. Therefore, the wireless communication can start between the pieces of user equipment (the child equipment 20-2 and the connection-available child equipment 20-3) without placing the operational load on the user.

In addition, the user equipment 20 according to the present embodiment, for example, can be applied not only to types of mobile user equipment, such as a personal computer, a smartphone, a digital camera, and a mobile player, but also to stationary types of user equipment, such as a television receiver, an NAS, and a stereo system.

Incidentally, the sequence of processing by each of the parent equipment 20-1, the child equipment 20-2, and the connection-available child equipment 20-3 described above can be executed in hardware, and can be executed in software. If the sequence of processing is executed in software, a program making up the software is installed on a computer. The computers here include a computer that is built into dedicated hardware, a general-purpose personal computer that is capable of executing various functions by installing various programs, and the like.

Figure 12:
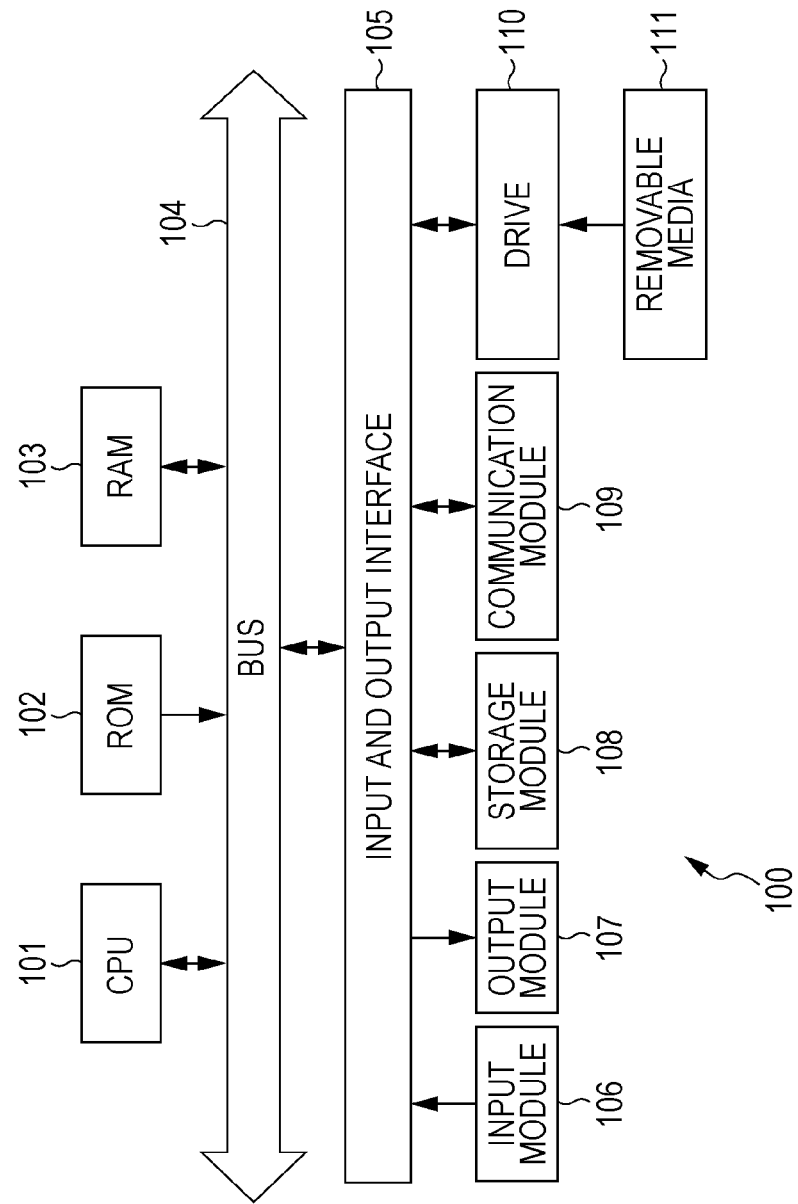
FIG. 12 is a block diagram illustrating a configuration example of a computer.

FIG. 12 is a block diagram illustrating an example of a hardware configuration of the computer that executes the sequences of processing described above using the program.

In a computer 100, a central processing unit (CPU) 101, a read only memory (ROM) 102, a random access memory (RAM) 103 are connected to one another through a bus 104.

An input and output interface 105 is connected to the bus 104. An input module 106, an output module 107, a storage module 108, a communication module 109, and a drive 110 are connected to the input and output interface 105.

The input module 106 is configured as a keyboard, a mouse, a microphone, or the like. The output module 107 is configured as a display, a speaker, or the like. The storage module 108 is configured as a hard disk, a non-volatile memory, or the like. The communication module 109 is configured as a network interface, or the like. The drive 110 drives removable media 111, such as a magnetic disk, an optical disk, a magneto-optical disk, or a semiconductor memory.

In the computer 100 with the configuration described above, the CPU 101 performs the sequence of processing described above, for example, by loading the program stored in the storage module 108 onto the RAM 103 through the input and output interface 105 and the bus 104 and thus executing the program.

Moreover, the program executed by the computer may be a program by which the processing is performed in time series in the order described in the present specification, or may be a program by which the processing is performed in parallel or at necessary timing, such as when a call for the program is performed.

Moreover, embodiments according to the present disclosure are not limited to the embodiments described above, and various modifications are possible within a scope that does not deviate from the gist of the present disclosure.

REFERENCE SIGNS LIST

10 COMMUNICATION SYSTEM
20 USER EQUIPMENT
20-1 PARENT EQUIPMENT
20-2 CHILD EQUIPMENT
20-3 CONNECTION-AVAILABLE CHILD EQUIPMENT
21 CONTROL MODULE
22 STORAGE MODULE
23 U/I MODULE
24 COMMUNICATION MODULE
31 NETWORK MANAGEMENT MODULE
32 APPROVAL LIST MANAGEMENT MODULE
33 AUTHENTICATION MODULE
41 CLOSE-PROXIMITY DETECTION MODULE
42 AUTHENTICATION MODULE
43 COMMUNICATION MODULE
51 CLOSE-PROXIMITY DETECTION MODULE
52 AUTHENTICATION MODULE
53 COMMUNICATION MODULE

100 COMPUTER
101 CPU

The invention claimed is:

1. A user equipment that performs wireless communication as a child equipment which belongs to a group which is managed by a parent equipment, the user equipment comprising:
   a detection module that detects a different user equipment and performs authentication processing with the different user equipment that is detected;
   a notification module that notifies the parent equipment of identification information indicating the different user equipment that has been authenticated; and
   a communication module that performs the wireless communication with the different user equipment that is caused to belong to the group that is managed by the parent equipment,
   wherein, after a predetermined time elapses from the authentication, the different user equipment directly transmits a provisioning request for requesting a connection to the parent equipment.

2. The user equipment according to claim 1,
   wherein the communication module performs the wireless communication with the different user equipment that is caused by the parent equipment to belong to the group, based on the identification information that is notified by the notification module.

3. The user equipment according to claim 2,
   wherein the detection module authenticates the different user equipment, by detecting the different user equipment as being in close proximity.

4. The user equipment according to claim 3,
   wherein the detection module detects the different user equipment as being in close proximity, based on strength of a wireless signal that is transmitted by the different user equipment.

5. The user equipment according to claim 3,
   wherein the detection module detects the different user equipment as being in close proximity using Near Field Communication (NFC).

6. The user equipment according to claim 1, wherein the user equipment is at least any one of a personal computer, a smartphone, a digital camera, and a mobile player.

7. The user equipment according to claim 1, wherein the user equipment is at least any one of a television receiver, and a stereo system.

8. The user equipment according to claim 1, wherein the user equipment includes a user interface.

9. A communication method for use in a user equipment that performs wireless communication as a child equipment which belongs to a group which is managed by a parent equipment, the communication method comprising:
   a detection step of causing the user equipment to detect a different user equipment;
   an authentication step of performing authentication processing with the different user equipment that is detected;
   a notification step of notifying the parent equipment of identification information indicating the different user equipment that has been authenticated; and
   a communication step of performing the wireless communication with the different user equipment that is caused to belong to the group that is managed by the parent equipment,
   wherein, after a predetermined time elapses from the authentication, the different user equipment directly transmits a provisioning request for requesting a connection to the parent equipment.

10. A non-transitory computer readable storage medium, having stored thereon, a set of instructions for causing a computer that performs wireless communication as a child equipment which belongs to a group that is managed by a parent equipment, to function as:
    a detection module that detects a different user equipment and performs authentication processing with the different user equipment that is detected;
    a notification module that notifies the parent equipment of identification information indicating the different user equipment that has been authenticated; and
    a communication module that performs the wireless communication with the different user equipment that is caused to belong to the group that is managed by the parent equipment,
    wherein, after a predetermined time elapses from the authentication, the different user equipment directly transmits a provisioning request for requesting a connection to the parent equipment.

11. A user equipment that performs wireless communication with a child equipment which belongs to a group which is managed by the user equipment itself as a parent equipment, the user equipment comprising:
    a network management module that transmits, to a different user equipment that is to be authenticated by the child equipment, a probe response that includes identification information of the child equipment that belongs to the group of the user equipment;
    an obtainment module that obtains identification information indicating the different user equipment that has been authenticated by the child equipment, which is notified from the child equipment; and
    an authentication module that, if there is a connection request from the different user equipment that does not belong to the group, authenticates connection of the different user equipment that does not belong to the group, based on the identification information that is notified from the child equipment.

12. The user equipment according to claim 11,
    wherein for management, the obtainment module obtains and lists the identification information that is notified from the child equipment, and
    wherein if there is the connection request from the different user equipment that does not belong to the group, the authentication module determines whether or not connection of the different user equipment that does not belong to the group is approved, by referring to the identification information that is listed.

13. A communication method for use in a user equipment that performs wireless communication with a child equipment which belongs to a group which is managed by the user equipment itself as a parent equipment, the communication method comprising:
    a transmission step of causing the user equipment to transmit, to a different user equipment that is to be authenticated by the child equipment, a probe response that includes identification information of the child equipment that belongs to the group of the user equipment;
    an obtainment step of causing the user equipment to obtain identification information indicating the different user equipment that has been authenticated by the child equipment, which is notified from the child equipment; and
    an authentication step of authenticating connection of the different user equipment that does not belong to the group, based on the identification information that is notified from the child equipment, if there is a connection request from the different user equipment that does not belong to the group.

14. A non-transitory computer readable storage medium, having stored thereon, a set of instructions for causing a computer that performs wireless communication with a child equipment that belongs to a group that is managed by the computer itself as a parent equipment, to function as:
   a network management module that transmits, to a different user equipment that is to be authenticated by the child equipment, a probe response that includes identification information of the child equipment that belongs to the group of the user equipment;
   an obtainment module that obtains identification information indicating the different user equipment that has been authenticated by the child equipment, which is notified from the child equipment; and
   an authentication module that, if there is a connection request from the different user equipment that does not belong to the group, authenticates connection of the different user equipment that does not belong to the group, based on the identification information that is notified from the child equipment.

15. A communication system in which a parent equipment and a child equipment that belongs to a group that is managed by the parent equipment perform wireless communication,
   wherein the child equipment includes:
      a detection module that detects a different user equipment and performs authentication processing with the different user equipment that is detected,
      a notification module that notifies the parent equipment of identification information indicating the different user equipment that has been authenticated, and
      a communication module that performs the wireless communication with the different user equipment that is caused to belong to the group that is managed by the parent equipment, and
   wherein the parent equipment includes:
      a network management module that transmits, to the different user equipment that is to be authenticated by the child equipment, a probe response that includes identification information of the child equipment that belongs to the group of the user equipment;
      an obtainment module that obtains the identification information which is notified from the child equipment, and
      an authentication module that, if there is a connection request from the different user equipment that does not belong to the group, authenticates connection of the different user equipment that does not belong to the group, based on the identification information that is notified from the child equipment.

16. A user equipment that performs wireless communication as a parent equipment that belongs to a group, the user equipment comprising:
   a network management module that transmits, to a different user equipment that is to be authenticated by a child equipment, a probe response that includes identification information of the child equipment that belongs to the group of the user equipment;
   a reception module that receives identification information indicating the different user equipment that has been authenticated, from the child equipment that, unlike the different user equipment, has a close-proximity detection module; and
   a registration module that puts the identification information on a list.

17. The user equipment according to claim 16, wherein the close-proximity detection module is configured using Near Field Communication (NFC).

18. The user equipment according to claim 16, wherein the user equipment is at least any one of a personal computer, a smartphone, a digital camera, and a mobile player.

19. The user equipment according to claim 16, wherein the user equipment is at least any one of a television receiver, and a stereo system.

20. The user equipment according to claim 16, wherein the user equipment includes a user interface.

* * * * *